Patented June 10, 1924.

1,497,231

UNITED STATES PATENT OFFICE.

MAXIMILIAN P. SCHMIDT AND ALFRED HAGENBÖCKER, OF BIEBRICH-ON-THE-RHINE, GERMANY, ASSIGNORS TO THE FIRM KALLE & CO., AKTIENGESELLSCHAFT, AT BIEBRICH-ON-THE-RHINE, GERMANY.

MANUFACTURE OF VAT DYESTUFFS.

No Drawing.   Application filed November 20, 1923. Serial No. 675,933.

*To all whom it may concern:*

Be it known that we, MAXIMILIAN P. SCHMIDT and ALFRED HAGENBÖCKER, both citizens of the German Republic, and residents of Biebrich-on-the-Rhine, Germany, have invented certain new and useful Improvements in the Manufacture of Vat Dyestuffs, of which the following is a specification.

We have found that derivatives of the acenaphthenone of the following constitution

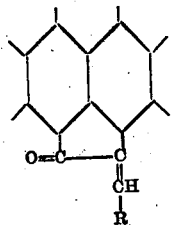

where R represents an alkyl- aryl- or aralkyl-group (substituted or not) may be converted into valuable vat-dyestuffs by fusing them with alkali.

These coloring matters dye especially cotton in different tints. The initial products may be obtained in general by treating acenaphthenone with aldehydes.

*Example:*

1 part by weight of benzylidenacenaphthenone of the melting point of 107° C. (see Gräbe & Jequier, Liebigs Annalen vol. 290, p. 204) are heated with 5 parts by weight of caustic potash to about 200–260° C. A dark melt of coloring matter is produced which is treated with water. The greatest part of it is dissolved with a red color. Air is blown into the mass, whereby the dyestuff still existing as leuco-compound is completely precipitated. By filtration it is separated from the alkaline lye. It is a black powder being reduced by alkaline hydrosulfite to a red vat from which the vegetable fibre is dyed dark-blue. In sulfuric acid it dissolves with a blue color.

Instead of the benzylidenacenaphthenone employed in the above example other condensation products of acenaphthenone with other aldehydes may be used, for instance chloro-, oxy- or aminoaldehydes of the benzene, naphthalene or anthracene series or aldehydes of the aliphatic series.

If for instance o-oxybenzylidenacenaphthenone (obtainable from acenaphthenone and salicylaldehyde) is fused with alkali according to the foregoing example, a coloring matter in form of a blue powder is obtained dying cotton in bluish-gray tints giving a gray on treating with soap. The o-oxybenzylidenacenaphthenone crystallizes from glacial acetic acid in yellow needles melting at 186°. In caustic soda lye it dissolves to an orange-yellow solution, from which it is precipitated by means of acids. In organic solvents, except ligroine, it dissolves readily.

We claim:

1. Process of producing vat-dyestuffs consisting in fusing with alkaline agents compounds of the following constitution

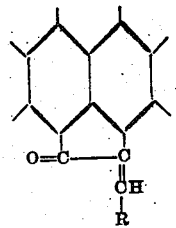

where R represents an alkyl- aryl- or aralkyl-group.

2. Process of producing vat-dyestuffs consisting in fusing with alkali hydroxide compounds of the following constitution

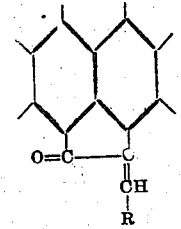

where R represents an alkyl- aryl- or aralkyl- group.

3. Process of producing vat-dyestuffs consisting in fusing with alkaline agents the condensation products of acenaphthenone with aldehydes.

4. Process of producing vat-dyestuff, consisting in fusing with alkali hydroxide the condensation products of acenaphthenone with aldehydes.

5. Process of producing vat-dyestuffs consisting in fusing the condensation product of acenaphthenone and benzaldehyde with alkaline agents.

6. As new products the vat-dyestuffs obtainable by fusing compounds of the formula

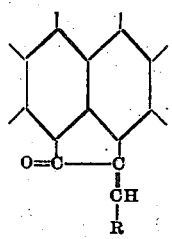

with alkaline agents.

7. As new products the vat-dyestuffs obtainable by fusing the condensation products of acenaphthenone and aldehydes with alkaline agents.

8. As a new product the vat-dyestuff obtainable by fusing the condensation product of acenaphthenone and benzaldehyle with alkaline agents.

In testimony whereof we have signed our names to this specification in the presence of two subscribing witnesses.

MAXIMILIAN P. SCHMIDT.
ALFRED HAGENBÖCKER.

Witnesses:
 Dr. August Roth,
 Jane Quest.